United States Patent
Tsuneki et al.

(10) Patent No.: US 9,893,662 B1
(45) Date of Patent: Feb. 13, 2018

(54) SERVOMOTOR CONTROL DEVICE, SERVOMOTOR CONTROL METHOD, AND COMPUTER READABLE RECORDING MEDIUM

(71) Applicant: FANUC CORPORATION, Yamanashi (JP)

(72) Inventors: Ryoutarou Tsuneki, Yamanashi (JP); Satoshi Ikai, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/651,015

(22) Filed: Jul. 17, 2017

(30) Foreign Application Priority Data

Jul. 25, 2016 (JP) .................................. 2016-145535

(51) Int. Cl.
- *G05B 11/01* (2006.01)
- *H02P 8/14* (2006.01)
- *H02P 8/34* (2006.01)

(52) U.S. Cl.
CPC . *H02P 8/14* (2013.01); *H02P 8/34* (2013.01)

(58) Field of Classification Search
CPC ......... G05B 11/00; G05B 11/01; G05B 11/14; G05B 13/00; G05B 13/02; G05B 13/04; G05B 19/00; G05B 19/045; G05B 19/18; G05B 19/4062; G05B 19/416; G05B 1/02; F04D 15/00; H02P 1/00; H02P 6/00; H02P 21/00; H02P 23/00; H02P 27/00

USPC .......... 318/3, 5, 560, 596, 609, 610, 568.18, 318/568.19, 568.22, 618, 619, 625, 628, 318/632, 638, 689, 432, 400.01, 700, 725, 318/727, 690, 34, 55, 58, 66, 68, 69, 448, 318/457, 779, 799, 735, 822, 268; 388/800, 906, 930

See application file for complete search history.

(56) References Cited

U.S. PATENT DOCUMENTS 5,475,291 A * 12/1995 Yoshida ............... G05B 13/024
  318/560
5,886,491 A * 3/1999 Yoshida ............... G05B 13/024
  318/568.17

FOREIGN PATENT DOCUMENTS

JP 06-319284 A 11/1994

\* cited by examiner

*Primary Examiner* — Antony M Paul
(74) *Attorney, Agent, or Firm* — Studebaker & Brackett PC (57) ABSTRACT

A servomotor control device includes a torque command creation part for creating a torque command value for driving a servomotor. The torque command creation part includes a proportional gain part and an integral gain part. An integral gain is set as a value calculated by multiplying an initial value, by a ratio $J/J_m$ of total inertia of a machine relative to rotor inertia of the servomotor, and a value set smaller than the square of a velocity gain magnification according to delay time of the velocity control loop. A proportional gain is a value calculated by adding a value according to a difference in calculation cycle between the integral term and the proportional term, and the integral gain, to a value calculated by multiplying an initial value by the ratio $J/J_m$ and the velocity gain magnification.

11 Claims, 7 Drawing Sheets

FIG. 1

$K_t$: TORQUE CONSTANT
$J = J_m + J_L$: TOTAL INERTIA
$J_m$: ROTOR INERTIA
$J_L$: LOAD INERTIA OF MACHINE

$K_t$: TORQUE CONSTANT
$J=J_m+J_L$: TOTAL INERTIA
$J_m$: ROTOR INERTIA
$J_L$: LOAD INERTIA OF MACHINE
$\delta$: DIFFERENCE IN SAMPLING TIMES (CALCULATION CYCLES)
   BETWEEN INTEGRAL TERM AND PROPORTIONAL TERM

SERVOMOTOR CONTROL DEVICE, SERVOMOTOR CONTROL METHOD, AND COMPUTER READABLE RECORDING MEDIUM

This application is based on and claims the benefit of priority from Japanese Patent Application No. 2016-145535, filed on 25 Jul. 2016, the content of which is incorporated herein by reference.

BACKGROUND OF THE INVENTION

Field of the Invention

The present invention relates to a servomotor control device, a servomotor control method and a computer readable recording medium.

Related Art

A servomotor is used in applications that drive a feed shaft, etc. A velocity control loop that controls the velocity of a servomotor generally adopts PID control (Proportional-Integral-Differential Control), which includes a proportional gain, integral gain, and depending on the case, derivative gain. The optimum values for velocity control loop gain are decided depending not only on the motor, but also on the characteristics of the machine connected to the servomotor (load inertia ratio, resonance frequency, etc.).

The servomotor cannot decide the optimum values in advance due to being used as the drive shaft of various machines, etc. Therefore, the initial value for the velocity control loop gain is decided so as to have responsiveness for the motor alone, and for the velocity control loop gain, adjustment is performed so that responsiveness tailored to the machinery is obtained by multiplying a constant by this initial value. The initial value of the velocity control loop gain is decided for every motor so that the velocity control loop has responsiveness that is for the motor alone.

Patent Document 1 discloses increasing the integral gain by the square of the proportional gain percentage in the case of a delay time not existing in the control system, in order to increase the responsiveness while keeping the damping characteristic constant.

Patent Document 1: Japanese Unexamined Patent Application, Publication No. H06-319284

SUMMARY OF THE INVENTION

However, delay such as the delay due to the responsiveness of the current control loop, which is inside of the velocity control loop, the delay of the signal of a speed detector, and the delay due to computation period of the speed control loop, exists in the velocity control loop. For this reason, if increasing the integral gain by the square of the proportional gain magnification, the velocity gain will be limited at the boundary according to only the integral gain, and it will not be possible to sufficiently raise the proportional gain.

The present invention has an object of providing a servomotor control device, servomotor control method, and computer-readable recording medium that can raise the responsiveness in a multi-rate system having different calculation cycles for the integral term and proportional term of a velocity control loop, even in a case of a delay time existing in the high-velocity control loop.

According to a first aspect of the present invention, a servomotor control device includes: a velocity command creation part that creates a velocity command value for driving a servomotor; a velocity detection part that detects velocity of the servomotor; and a torque command creation part that creates a torque command value to the servomotor using a difference between a velocity command value created by the velocity command creation part and a velocity detection value detected by the velocity detection part, in which the velocity control loop includes the velocity detection part and the torque command creation part, the torque command creation part includes a proportional gain part to which the difference is inputted, and an integral gain part and an integrator to which the difference in inputted, the calculation cycle for calculating a proportional term by the proportional gain part is shorter than a calculation cycle for calculating an integral term by the integral gain part and the integrator, integral gain of the integral gain part is a value calculated by multiplying an initial value for the integral gain decided in advance for every motor model, by a ratio of total inertia of a machine relative to rotor inertia of the servomotor, and a value set smaller than the square of a velocity gain magnification according to delay time of the velocity control loop, and proportional gain of the proportional gain part is a value calculated by adding a value according to a difference in calculation cycle between the integral term and the proportional term, and the integral gain, to a value calculated by multiplying an initial value for the proportional gain decided in advance for every motor model, by a ratio of the total inertia of the machine relative to rotor inertia of the servomotor and the velocity gain magnification.

According to a second aspect of the present invention, in the servomotor control device as described in the first aspect, a value set smaller than the square of the velocity gain magnification according to delay time of the velocity control loop may be set as the β-th power of the velocity gain magnification, using the constant β assuming a value of one or more and less than two according to the delay time of the velocity control loop.

According to a third aspect of the present invention, in the servomotor control device as described in the first or second aspect, the value according to the difference in calculation cycles between the integral term and the proportional term, and the integral gain may be the product of the difference in calculation cycles between the integral term and the proportional term, and the integral gain.

According to a fourth aspect of the present invention, in the servomotor control device as described in the second or third aspect, the constant β may be obtained, using a time delay τ of the velocity control loop and a constant γ, from an equation $\beta = 2 - \gamma\tau$.

According to a fifth aspect of the present invention, the servomotor control device as described in any one of the first to fourth aspects may further include: a position command creation part that creates a position command value for the servomotor; and a position detection part that detects a position of the servomotor, in which the velocity command creation part creates a velocity command value using a difference between the position command value created by the position command creation part, and a position detection value detected by the position detection part.

According to a sixth aspect of the present invention, a servomotor control method for a servomotor control device includes the steps of: creating a velocity command value for driving a servomotor; detecting velocity of the servomotor; and creating a torque command value to the servomotor using a difference between the velocity command value thus created and a velocity detection value thus detected, in which the servomotor is controlled according to the torque command value, in which at least the detecting of the velocity of the servomotor and the creating of the torque command value are performed in a velocity control loop, in which the creating of the torque command value is performed using proportional gain to which the difference is inputted, and an integral gain and an integrator to which the difference is inputted, and a calculation cycle for calculating a proportional term by the proportional gain is shorter than a calculation cycle for calculating an integral term by the integral gain and the integrator, in which the integral gain is a value calculated by multiplying an initial value for the integral gain decided in advance for every motor model, by a ratio of total inertia of a machine relative to rotor inertia of the servomotor, and a value set smaller than the square of a velocity gain magnification according to delay time of the velocity control loop, and in which the proportional gain is a value calculated by adding a value according to a difference in calculation cycle between the integral term and the proportional term, and the integral gain, to a value calculated by multiplying an initial value for the proportional gain decided in advance for every motor model, by a ratio of the total inertia of the machine relative to rotor inertia of the servomotor and the velocity gain magnification.

According to a seventh aspect of the present invention, in the servomotor control method as described in the sixth aspect, a value set smaller than the square of the velocity gain magnification according to delay time of the velocity control loop may be set as the β-th power of the velocity gain magnification, using the constant β assuming a value of one or more and less than two according to the delay time of the velocity control loop.

According to an eighth aspect of the present invention, in the servomotor control method as described in the seventh aspect, the value according to the difference in calculation cycles between the integral term and the proportional term, and the integral gain may be the product of the difference in calculation cycles between the integral term and the proportional term, and the integral gain.

According to a ninth aspect of the present invention, in the servomotor control method as described in the seventh or eighth aspect, the constant β is obtained, using a time delay τ of the velocity control loop and a constant γ, as β=2−γτ.

According to a tenth aspect of the present invention, the servomotor control method as described in any one of the sixth to ninth aspects may further include the steps of: creating a position command value of the servomotor; detecting a position of the servomotor; and creating the velocity command value using a difference between the position command value thus created and a position detection value thus detected.

According to an eleventh aspect of the present invention, a servomotor control program enables a computer, serving as a servomotor control device that controls a servomotor, to execute processing of: creating a velocity command value for driving the servomotor; detecting a velocity of the servomotor; and creating a torque command value for the servomotor using a difference between the velocity command value thus created and a velocity detection value thus detected, wherein at least the processing of detecting the velocity and the processing of creating the torque command value are executed in a velocity control loop, wherein the processing of creating the torque command value is performed using proportional gain to which the difference is inputted, and an integral gain and an integrator to which the difference is inputted, and a calculation cycle for calculating a proportional term by the proportional gain is shorter than a calculation cycle for calculating an integral term by the integral gain and the integrator, wherein the integral gain is a value calculated by multiplying an initial value for the integral gain decided in advance for every motor model, by a ratio of total inertia of a machine relative to rotor inertia of the servomotor, and a value set smaller than the square of a velocity gain magnification according to delay time of the velocity control loop, and wherein the proportional gain is a value calculated by adding a value according to a difference in calculation cycle between the integral term and the proportional term, and the integral gain, to a value calculated by multiplying an initial value for the proportional gain decided in advance for every motor model, by a ratio of the total inertia of the machine relative to rotor inertia of the servomotor and the velocity gain magnification.

According to the present invention, it is possible to raise the responsiveness in a multi-rate system having different calculation cycles for the integral term and proportional term of a velocity control loop, even in a case of a delay time existing in the high-velocity control loop.

DETAILED DESCRIPTION OF THE INVENTION

Hereinafter, an embodiment of the present invention will be explained in detail using the drawings. Technology premised on the embodiment of the present invention will be explained for the case of delay time not existing in the velocity control loop. From the point of the rigidity of the machine not being high conventionally, and a filter technology for avoiding machine resonance of high frequency being insufficient, the magnification multiplied by the initial value for the velocity control loop gain has not been set very high.

Figure 1:
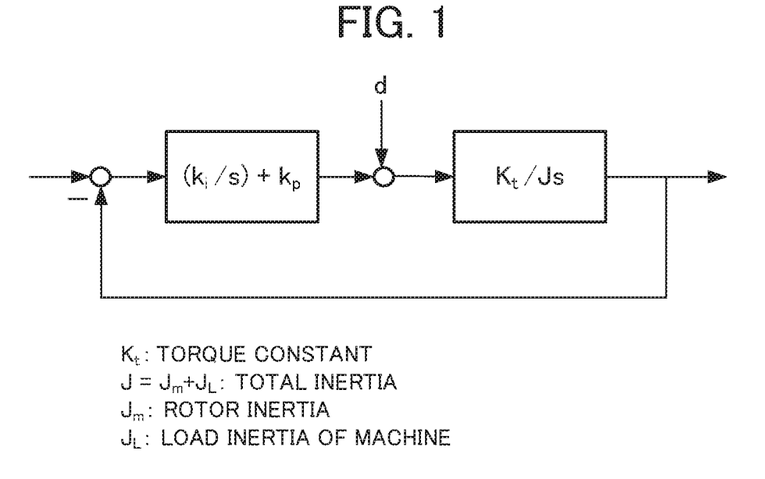
FIG. 1 is a block diagram of a control system in a case of delay time not existing in the control system.

However, the magnification multiplied by the initial value for the velocity control loop gain has been rising due to the rigidity of the machine become higher, and improvements in the filter technology for avoiding machine resonance. Letting delay time not exist at all in the control system, the block diagram of the control system will be a block diagram such as that shown in FIG. 1. A transfer function from disturbance d until output y is Numerical Formula 1 (shown as Formula 1).

$$\frac{y}{d} = \frac{\frac{K_t}{J}s}{s^2 + \frac{K_t k_p}{J}s + \frac{K_t k_i}{J}} = \frac{\frac{K_t}{J}s}{s^2 + 2\zeta\omega_n s + \omega_n^2} \quad \text{[Formula 1]}$$

The integral gain $k_i$ and proportional gain $k_p$ become a numerical formula (shown as Formula 2) when expressed by cut-off frequency $\omega_n$ and damping coefficient $\zeta$.

$$k_i = \frac{J}{K_t}\omega_n^2 = \left(1 + \frac{J_L}{J_m}\right) \times \frac{J_m}{K_t}\omega_n^2 \quad \text{[Formula 2]}$$
$$k_p = \frac{2\zeta J}{K_t}\omega_n = \left(1 + \frac{J_L}{J_m}\right) \times \frac{2\zeta J_m}{K_t}\omega_n$$

Formula 2 can be modified as numerical formula 3 (shown as Formula 3).

$$k_i = \frac{J}{K_t}\omega_n^2 = \left(\frac{J_m}{K_t}\omega_{n0}^2\right) \times \left(1 + \frac{J_L}{J_m}\right) \times \left(\frac{\omega_n}{\omega_{n0}}\right)^2 \quad \text{[Formula 3]}$$
$$k_p = \frac{2\zeta J}{K_t}\omega_n = \left(\frac{2\zeta J_m}{K_t}\omega_{n0}\right) \times \left(1 + \frac{J_L}{J_m}\right) \times \left(\frac{\omega_n}{\omega_{n0}}\right)$$

The initial value of integral gain and initial value of proportional gain are decided in advance by a certain standard responsiveness for every motor model. The initial value of the integral gain is decided as in numerical formula 4 below (shown as Formula 4), and the initial value of the proportional gain is decided as in numerical formula 5 (shown as Formula 5).

$$\frac{J_m}{K_t}\omega_{n0}^2 \quad \text{[Formula 4]}$$

$$\frac{2\zeta J_m}{K_t}\omega_{n0} \quad \text{[Formula 5]}$$

Conventionally, adjustment of the velocity control loop has been performed by raising the proportional gain and integral gain by the same magnification. Although this is correct if considering the load inertia ratio, when also adjusting the responsiveness according to this, there has been a problem in that the damping characteristic changes according to the gain magnification. In addition, since the boundary of the velocity gain is limited by only the proportional gain, it has not been possible to adopt a high integral gain. In the case of delay time not existing in the velocity control loop with Patent Document 1, as already explained, the integral gain has increased by the square of the proportional gain magnification in order to increase the responsiveness while keeping the damping characteristic constant.

Figure 2:
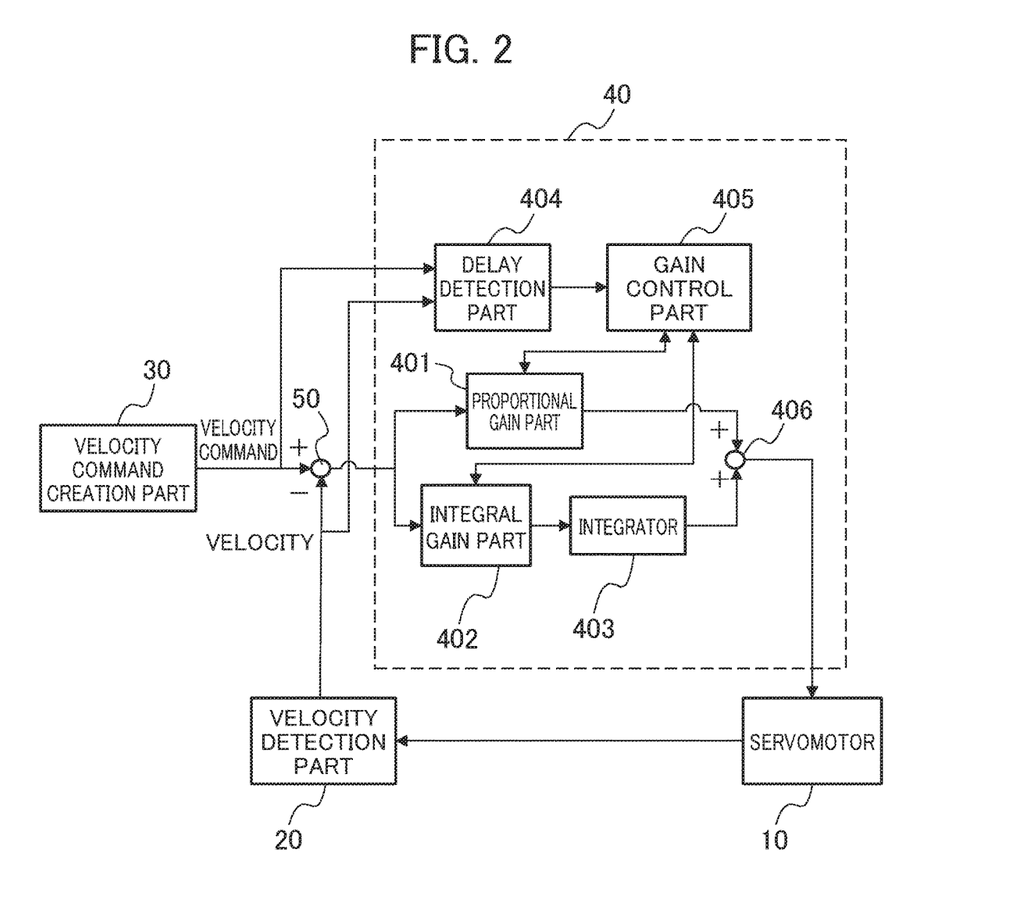
FIG. 2 is a block diagram showing a servomotor control device and servomotor of a first embodiment of the present invention.

Hereinafter, an embodiment of the present invention will be explained in detail using the drawings. The present embodiment is established so as to enable raising the responsiveness in a multi-rate system having different calculation cycles for the integral term and proportional term of a velocity control loop, even in a case of delay time existing in the velocity control loop. FIG. 2 is a block diagram showing a servomotor control device and servomotor of an embodiment of the present invention. The servomotor control device shown in FIG. 2 includes a velocity detection part 20 that detects the rotational velocity of a servomotor 10 and outputs a velocity value, a velocity command creation part 30 that creates and outputs a velocity command to the servomotor 10, a torque command creation part 40, and a subtracter that obtains the difference between the velocity command value and velocity value. The torque command creation part 40 includes: a proportional gain part 401 and integral gain part 402, which are connected to the subtracter 50; an integrator 403 connected to the integral gain part 402; a delay detection part 404 that uses the velocity command and the detected velocity to detect the delay time occurring in the velocity control loop; a gain control part 405 that adjusts the gains of the proportional gain part 401 and integral gain part 402; and an adder 406 that adds the output of the proportional gain part 401 and the output of the integrator 403, and outputs as the torque command to the servomotor 10. The integral gain part 402 multiplies the input by a coefficient, and the integrator 403 integrates the output of the integral gain part 402. The proportional gain part 401 multiplies the input by a coefficient. It should be noted that the integral gain part 402 and integrator 403 may change order of arrangement. The servomotor 10 drives the shaft of a machine tool, or an industrial machine.

Figure 3:
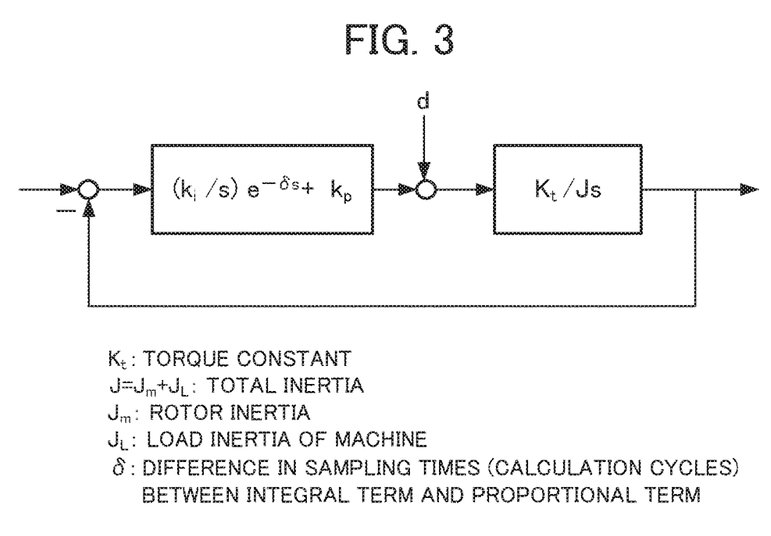
FIG. 3 is a block diagram of a control system in a case of delay time not existing in the control system, and the calculation cycles for an integral term and proportional term differing.

In order to raise responsiveness, it has been demanded to shorten the cycles executing the velocity control loop. However, in a processor executing control in order to shorten the cycles executing the velocity control loop, high calculation processing capability is required. Normally, the integral term has slower responsiveness than the proportional term. Therefore, by executing only the calculation for the proportional term having higher responsiveness in a shorter cycle, it is possible to obtain high responsiveness, while curbing an increase in processing time. In FIG. 2, the integral term is generated by the integral gain part 402 and integrator 403, and the proportional term is generated by the proportional gain part 401. In the case of performing computation of the proportional term at high speed compared to the computation of the integral term, it is possible to consider that the integral term has a delay time relative to the proportional term, and the block diagram becomes as shown in FIG. 3 (delay time of control target set to 0 in FIG. 3).

A transfer function C(s) of a controller is shown by the numerical formula 6 (shown as Formula 6).

$$C(s) = \frac{k_i}{s}e^{-\delta s} + k_p \quad \text{[Formula 6]}$$

With Numerical Formula 6 being approximated to the first order term by a Taylor expression, Numerical Formula 6 becomes Numerical Formula 7 (shown as Formula 7).

$$C(s) = \frac{k_i}{s}(1 + \delta s) + k_p \quad \text{[Formula 7]}$$
$$= \frac{k_i}{s} + k_p + \delta k_i$$

Therefore, the integral gain $k_i$ is shown by Numerical Formula 8 (shown as Formula 8), and the proportional gain $k_p$ is shown by Numerical Formula 9 (shown as Formula 9).

$$k_i = \left(\frac{J_m}{K_t}\omega_{n0}^2\right) \times \left(1 + \frac{J_L}{J_m}\right) \times \left(\frac{\omega_n}{\omega_{n0}}\right)^2 \quad \text{[Formula 8]}$$

$$k_p = \left(\frac{2\zeta J_m}{K_t}\omega_{n0}\right) \times \left(1 + \frac{J_L}{J_m}\right) \times \left(\frac{\omega_n}{\omega_{n0}}\right) + \delta k_i \quad \text{[Formula 9]}$$

Herein, $(1+J_L/J_m)$ becomes $J/J_m$, and $J/J_m$ becomes the ratio of the total inertia of the machine relative to rotor inertia of the servomotor. In addition, the value $\omega_n/\omega_{n0}$ is the velocity gain magnification VG. The proportional gain magnification becomes the velocity gain magnification VG (VG=$\omega_n/\omega_{n0}$), and the integral gain magnification becomes the square of the velocity gain magnification VG. The value $\delta k_i$ is an example of "value according to difference in calculation cycles between integral term and proportional term, and integral gain", and specifically, the "product of difference in calculation cycles between integral term and proportional term, and integral gain" can be exemplified.

In the case of delay time existing in the velocity control loop, when increasing the integral gain magnification by the square of the proportion gain magnification, it has been found that the integral gain becomes excessive as increasing the magnification. If the integral gain becomes excessive, the overshoot will increase to become oscillatory. By multiplying the integral gain by a value that is smaller than the square of the proportional gain magnification according to the delay time (establishing integral gain magnification<square of proportional gain magnification), the present inventors have found that it is possible to raise responsiveness without significantly changing the damping characteristic.

In order to set the integral gain magnification as a value smaller than the square of the proportional gain magnification, in the present embodiment, the integral gain magnification is obtained by the equation of (integral gain magnification)=(proportional gain magnification)$^\beta$ ($1 \leq \beta < 2$). However, these methods shown in the present embodiment are examples, and the integral gain magnification may become a value smaller than the square of the proportional gain magnification by another method. The value $\beta$ can be decided using the delay time occurring in the velocity control loop. The delay time occurring in the velocity control loop occurs due to the delay according to the responsiveness of the current control loop, the delay in the signal of the velocity detector, the delay according to the computation period of the velocity control loop, etc. as already explained; however, this delay is decided by the motor characteristics and the characteristics of the circuit constituting the velocity control loop, and can be determined in advance. Consequently, the value $\beta$ can also be decided in advance.

Taking into account the variation in delay time occurring in the velocity control loop, the present embodiment uses the velocity command and detected velocity, and the delay time occurring in the velocity control loop is detected by the delay detection part 404. By measuring the delay time in fed-back velocity relative to the velocity command, the delay time occurring in the velocity control loop can be detected. In the case of deciding the value $\beta$ in advance, the delay detection part 404 in FIG. 2 is unnecessary.

In Numerical Formula 8 and Numerical Formula 9, for example, if defining integral gain magnification=$\beta$-th power of proportional gain magnification ($1 \leq \beta < 2$), the integral gain $k_i$ and proportional gain $k_p$ are expressed by Numerical Formula 10 (shown as Formula 10) and Numerical Formula 11 (shown as Formula 11), respectively.

$$k_i = \left(\frac{J_m}{K_t}\omega_{n0}^2\right) \times \left(1 + \frac{J_L}{J_m}\right) \times \left(\frac{\omega_n}{\omega_{n0}}\right)^\beta \quad \text{[Formula 10]}$$

$$k_p = \left(\frac{2\zeta J_m}{K_t}\omega_{n0}\right) \times \left(1 + \frac{J_L}{J_m}\right) \times \left(\frac{\omega_n}{\omega_{n0}}\right) + \delta k_i \quad \text{[Formula 11]}$$

Figure 7:
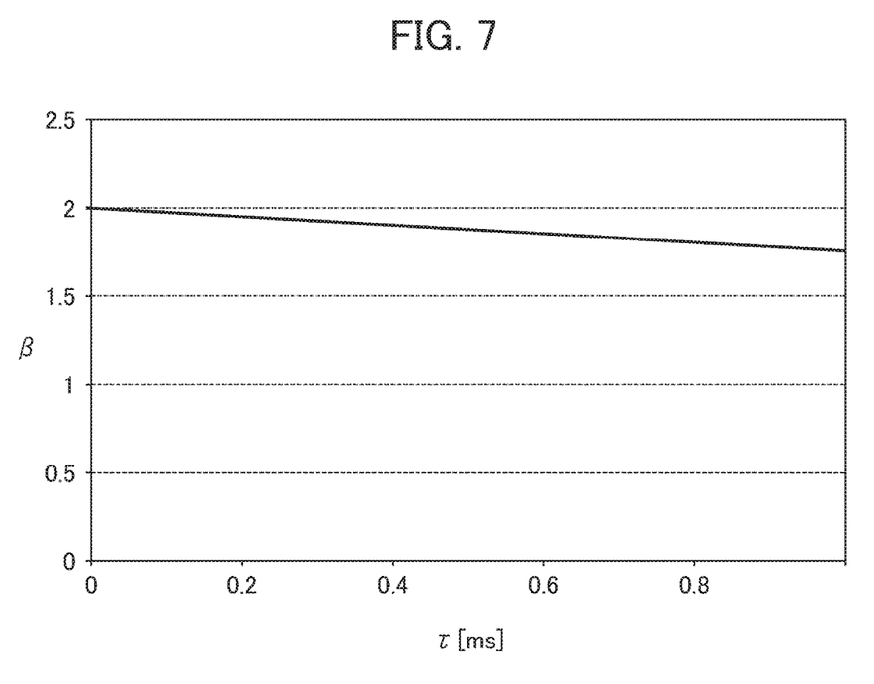
FIG. 7 is a characteristic diagram showing the relationship between a value β and delay time τ.

The integral gain magnification becomes the $\beta$-th power of the velocity gain magnification VG (VG$^\beta$=($\omega_n/\omega_{n0}$)$^\beta$). Although the value $\beta$ of the integral gain magnification can be decided in advance at the time of delivery, since the velocity gain magnification VG receives the influence of the machine characteristics, and thus cannot be decided in advance at the time of delivery, the velocity gain magnification VG is set as appropriate according to the characteristics of the machine tool coupled to the servomotor, etc. The value ($\omega_n/\omega_{n0}$)$^\beta$ ($1 \leq \beta < 2$), in one example of "value set smaller than the square of the velocity gain magnification (coefficient $\alpha$)", is a value establishing the $\beta$-th power of the velocity gain magnification (coefficient $\alpha$) using the constant $\beta$ assuming a value of at least 1 and less than 2. According to the knowledge of the present inventors, the integral gain magnification can be obtained by integral gain magnification=$\beta$-th power of proportional gain magnification ($1 \leq \beta < 2$), as shown in Numerical Formula 10 described above. In addition, according to the knowledge of the present inventors, value $\beta$ is expressed by a linear function when expressed by $\beta=2-\gamma\tau$, using the delay time $\tau$ and constant $\gamma$. Using this relationship, it is possible to obtain the value $\beta$ from the delay time $\tau$. The constant $\alpha$ is a fixed value, and can assume a value of approximately $\alpha=0.25$. An example of the relationship between the value $\beta$ and the delay time $\tau$ is shown in the characteristic chart of FIG. 7.

Figure 4:
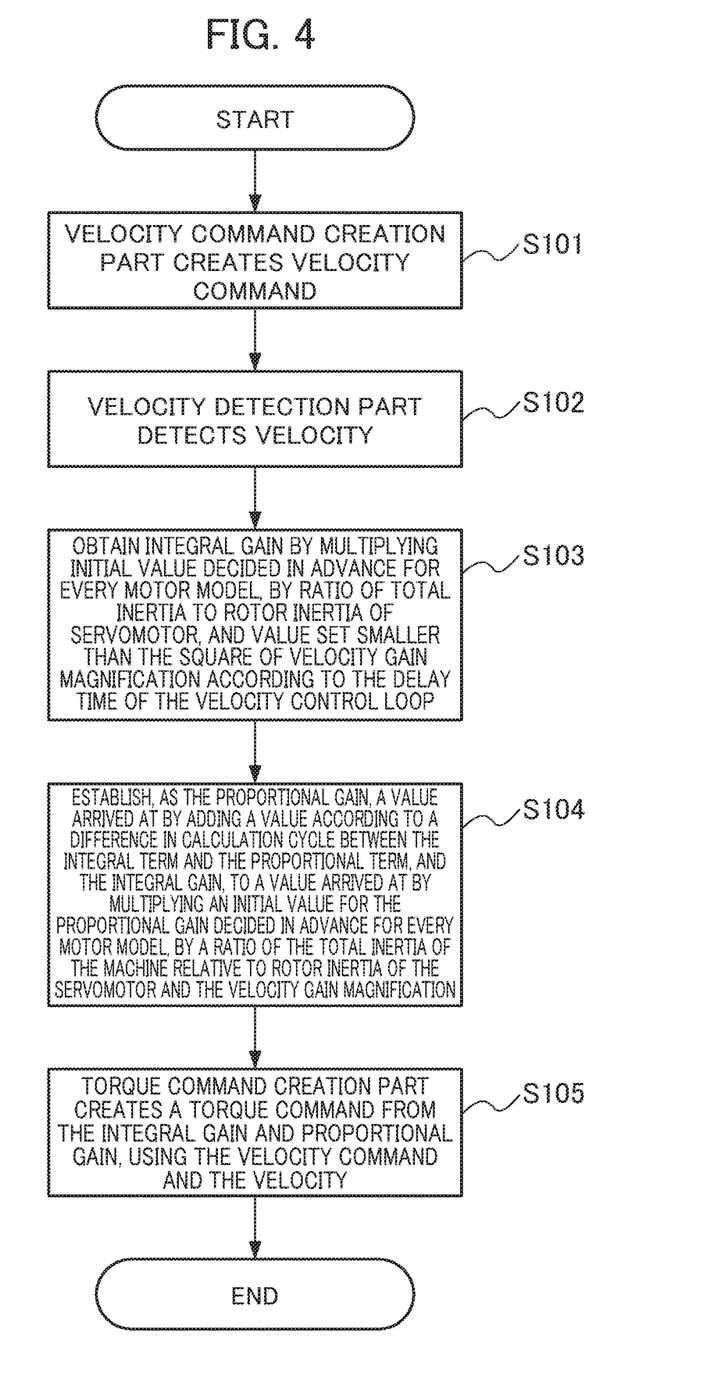
FIG. 4 is a flowchart showing operations of the servomotor control device shown in FIG. 1.

FIG. 4 is a flowchart showing operation of the servomotor control device shown in FIG. 2. First, in Step S101, the velocity command creation part 30 creates a velocity command, and the velocity detection part 20 detects the velocity in Step S102. Next, in Step S103, the gain control part 405 obtains the integral gain by multiplying the initial value decided in advance for every motor model, by a ratio of total inertia of the machine relative to rotor inertia (J/J$_m$), and a value set smaller than the square of the velocity gain magnification (coefficient $\alpha$) according to delay time of the control system (velocity control loop). Next, in Step S104, the gain control part 405 sets, as the proportional gain, the value calculated by adding the value according to the difference in calculation cycles for the integral term and proportional term and the integral gain, to a value calculated by multiplying the initial value decided in advance for every motor model by the ratio of the total inertia of the machine relative to rotor inertia (J/J$_m$) and the velocity gain magnification (coefficient $\alpha$). Next, in Step S105, the subtracter 50 obtains the difference between the velocity command value and detected value, and using this difference, the output value for the integrator 403 integrating the output value of the integral gain part 402 and the output value of the proportional gain part 401 are obtained, and the adder 406 creates and outputs a torque command by adding these output values.

Figure 5:
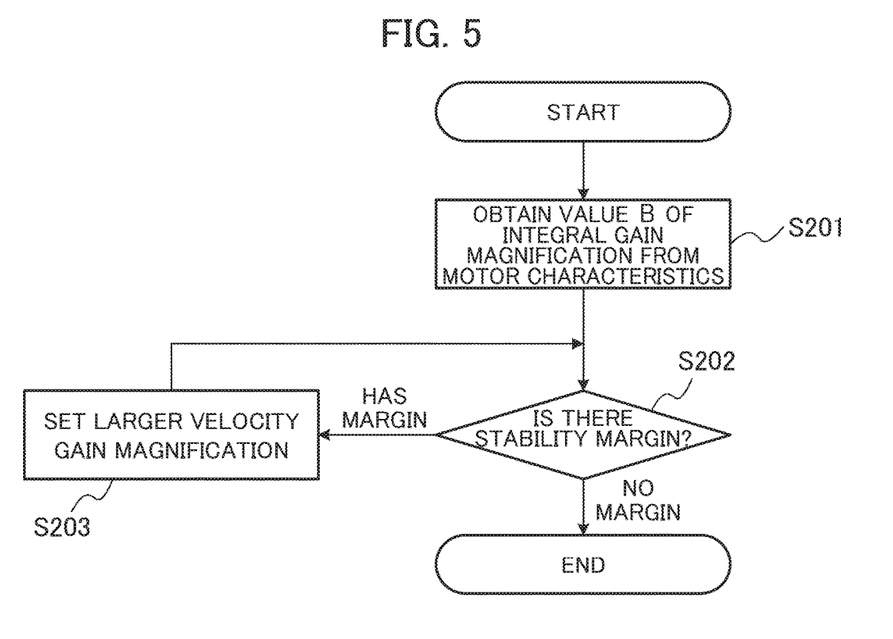
FIG. 5 is a flowchart showing a method for obtaining a velocity gain magnification.

FIG. 5 is a flowchart showing a method for obtaining the velocity gain magnification (coefficient $\alpha$). The gain control part 405 obtains the value $\beta$ from motor characteristics and/or characteristics of the circuit constituting the velocity control loop (Step S201). Next, the gain control part 405 determines whether or not there is a stability margin in the gain (Step S202). In the case of there being a stability margin, the gain control part 405 increases the velocity gain magnification (Step S203), and returns to Step S202. In the case of there not being a stability margin, the gain control part 405 maintains the velocity gain magnification that was set initially.

Figure 6:
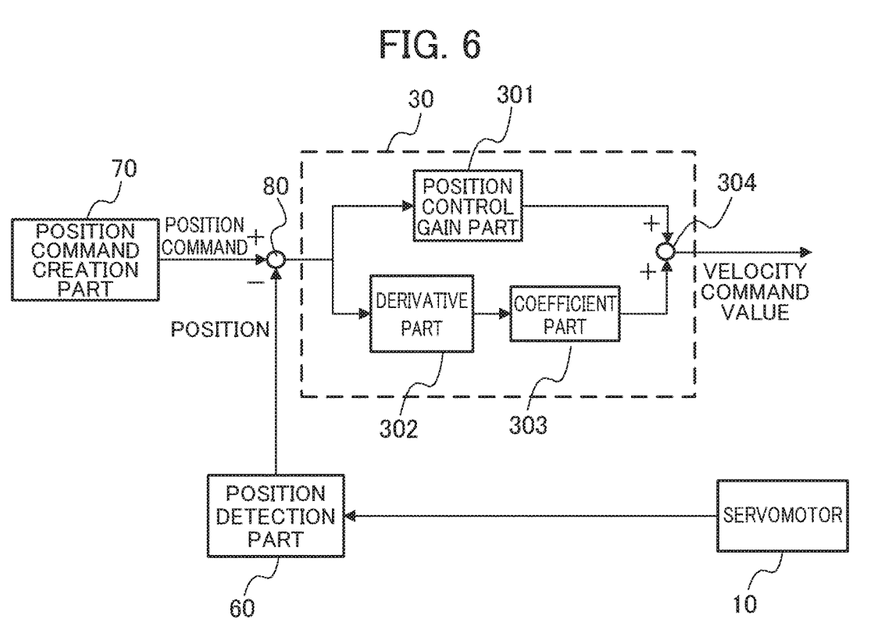
FIG. 6 is a block diagram showing a velocity command creation part, position detection part, position command creation part, and servomotor.

FIG. 6 is a block diagram showing the velocity command creation part, position detection part, position command creation part, and servomotor. The position command creation part 70 creates a position command, and the position detection part 60 detects the rotational position of the servomotor 10. The subtracter 80 obtains the difference between the position command value and position, and inputs this difference to the position control gain 301 and derivative part 302. The adder 304 outputs the added value of the output of the coefficient part 303 multiplying the output of the derivative part 302 by a coefficient, and the output of the position control gain 301, as a velocity command.

Although an embodiment of the present invention has been explained above, for the servomotor control device, the entirety or a part of the functions thereof can be realized by way of hardware, software or a combination thereof. Herein, being realized by way of software indicates being realized by a computer reading out and executing programs. In the case of constituting by hardware, a part or the entirety of the servomotor control device can be constituted by integrated circuits (IC) such as LSI (Large Scale Integrated circuit), ASIC (Application Specific Integrated Circuit), gate array, and FPGA (Field Programmable Gate Array), for example.

In the case of realizing by software, a part or the entirety of the servomotor control device is constituted by a computer including a CPU, and a storage unit such as a hard disk and ROM storing programs, and in accordance with the block diagram of FIG. 2 and program following the flowchart of FIG. 4, it is possible to execute a part or the entirety of the operations of the servomotor control device by programs, by storing the information required in computation on a second storage unit such as RAM, and executing the processing. The programs can be read into the storage unit such as a hard disk from computer-readable recording media on which the programs are recorded.

The programs can be stored using various types of computer-readable recording media (computer readable media), and provided to the computer. The computer-readable media includes non-transitory computer readable media. In addition, the computer readable recording media includes various types of tangible storage media. Examples of non-transitory computer-readable recording media include magnetic media (for example, flexible disk, magnetic tape, hard disk drive), magneto-optical recording media (for example, magneto-optical disk), CD-ROM (Read Only Memory), CD-R, CD-R/W, and semiconductor memory (for example, mask ROM, PROM (Programmable ROM), EPROM (Erasable PROM), flash ROM, RAM (random access memory)).

Although the respective embodiments and examples of the present invention have been explained above, the present invention is not to be limited to the aforementioned respective embodiments and examples, and for one skilled in the art, it is possible to modify or change into various forms within a scope not departing from the gist of the present invention, based on the disclosure in the claims, and these modified examples or changed examples also fall under the scope of rights of the present invention.

EXPLANATION OF REFERENCE NUMERALS 10 servomotor
20 velocity detection part
30 velocity command creation part
50 subtracter
60 position detection part
70 position command creation part
80 subtracter
401 proportional gain
402 integral gain
403 integrator
404 delay detection part
405 gain control part
406 adder

What is claimed is:

1. A servomotor control device comprising:
a velocity command creation part configured to create a velocity command value for driving a servomotor;
a velocity detection part configured to detect velocity of the servomotor; and
a torque command creation part configured to create a torque command value to the servomotor using a difference between a velocity command value created by the velocity command creation part and a velocity detection value detected by the velocity detection part,
wherein the velocity control loop includes the velocity detection part and the torque command creation part,
wherein the torque command creation part includes a proportional gain part to which the difference is inputted, and an integral gain part and an integrator to which the difference is inputted,
wherein the calculation cycle for calculating a proportional term by the proportional gain part is shorter than a calculation cycle for calculating an integral term by the integral gain part and the integrator,
wherein integral gain of the integral gain part is a value calculated by multiplying an initial value for the integral gain decided in advance for every motor model, by a ratio of total inertia of a machine relative to rotor inertia of the servomotor, and a value set smaller than the square of a velocity gain magnification according to delay time of the velocity control loop, and
wherein proportional gain of the proportional gain part is a value calculated by adding a value according to a difference in calculation cycle between the integral term and the proportional term, and the integral gain, to a value calculated by multiplying an initial value for the proportional gain decided in advance for every motor model, by a ratio of the total inertia of the machine relative to rotor inertia of the servomotor and the velocity gain magnification.

2. The servomotor control device according to claim 1, wherein a value set smaller than the square of the velocity gain magnification according to delay time of the velocity control loop is set as the β-th power of the velocity gain magnification, using the constant β assuming a value of one or more and less than two according to the delay time of the velocity control loop.

3. The servomotor control device according to claim 2, wherein the constant β is obtained, using a time delay τ of the velocity control loop and a constant γ, from an equation $\beta=2-\gamma\tau$.

4. The servomotor control device according to claim 1, wherein the value according to the difference in calculation cycles between the integral term and the proportional term, and the integral gain is the product of the difference in calculation cycles between the integral term and the proportional term, and the integral gain.

5. The servomotor control device according to claim 1, further comprising:
   a position command creation part configured to create a position command value for the servomotor; and
   a position detection part configured to detect a position of the servomotor,
   wherein the velocity command creation part creates a velocity command value using a difference between the position command value created by the position command creation part, and a position detection value detected by the position detection part.

6. A servomotor control method for a servomotor control device, the method comprising the steps of:
   creating a velocity command value for driving a servomotor;
   detecting velocity of the servomotor; and
   creating a torque command value to the servomotor using a difference between the velocity command value thus created and a velocity detection value thus detected,
   wherein the servomotor is controlled according to the torque command value,
   wherein at least the detecting of the velocity of the servomotor and the creating of the torque command value are performed in a velocity control loop,
   wherein the creating of the torque command value is performed using proportional gain to which the difference is inputted, and an integral gain and an integrator to which the difference is inputted, and a calculation cycle for calculating a proportional term by the proportional gain is shorter than a calculation cycle for calculating an integral term by the integral gain and the integrator,
   wherein the integral gain is a value calculated by multiplying an initial value for the integral gain decided in advance for every motor model, by a ratio of total inertia of a machine relative to rotor inertia of the servomotor, and a value set smaller than the square of a velocity gain magnification according to delay time of the velocity control loop, and
   wherein the proportional gain is a value calculated by adding a value according to a difference in calculation cycle between the integral term and the proportional term, and the integral gain, to a value calculated by multiplying an initial value for the proportional gain decided in advance for every motor model, by a ratio of the total inertia of the machine relative to rotor inertia of the servomotor and the velocity gain magnification.

7. The servomotor control method according to claim 6, wherein a value set smaller than the square of the velocity gain magnification according to delay time of the velocity control loop is set as the $\beta$-th power of the velocity gain magnification, using the constant $\beta$ assuming a value of one or more and less than two according to the delay time of the velocity control loop.

8. The servomotor control method according to claim 7, wherein the constant $\beta$ is set, using a time delay $\tau$ of the velocity control loop and a constant $\gamma$, as $\beta=2-\gamma\tau$.

9. The servomotor control method according to claim 6, wherein the value according to the difference in calculation cycles between the integral term and the proportional term, and the integral gain is the product of the difference in calculation cycles between the integral term and the proportional term, and the integral gain.

10. The servomotor control method according to claim 6, further comprising the steps of:
    creating a position command value of the servomotor;
    detecting a position of the servomotor; and
    creating the velocity command value using a difference between the position command value thus created and a position detection value thus detected.

11. A non-transitory computer-readable recording medium storing a servomotor control program for enabling a computer, serving as a servomotor control device that controls a servomotor, to execute processing of:
    creating a velocity command value for driving the servomotor;
    detecting a velocity of the servomotor; and
    creating a torque command value for the servomotor using a difference between the velocity command value thus created and a velocity detection value thus detected,
    wherein at least the processing of detecting the velocity and the processing of creating the torque command value are executed in a velocity control loop,
    wherein the processing of creating the torque command value is performed using proportional gain to which the difference is inputted, and an integral gain and an integrator to which the difference is inputted, and a calculation cycle for calculating a proportional term by the proportional gain is shorter than a calculation cycle for calculating an integral term by the integral gain and the integrator,
    wherein the integral gain is a value calculated by multiplying an initial value for the integral gain decided in advance for every motor model, by a ratio of total inertia of a machine relative to rotor inertia of the servomotor, and a value set smaller than the square of a velocity gain magnification according to delay time of the velocity control loop, and
    wherein the proportional gain is a value calculated by adding a value according to a difference in calculation cycle between the integral term and the proportional term, and the integral gain, to a value calculated by multiplying an initial value for the proportional gain decided in advance for every motor model, by a ratio of the total inertia of the machine relative to rotor inertia of the servomotor and the velocity gain magnification.

* * * * *